Patented Jan. 28, 1936

2,029,008

UNITED STATES PATENT OFFICE 2,029,008

MEANS FOR AND METHOD OF MASKING

Ralph A. Wilson, Chicago, Ill., assignor of one-half to George A. Chritton

No Drawing. Application February 13, 1932, Serial No. 592,841

4 Claims. (Cl. 134—17)

The invention relates to means for and a method of masking, and has, among its other objects, the provision of an improved non-drying adhesive which is particularly adapted to secure masks, etc., to surfaces which are to be lacquered, painted or decorated although it is not limited to such use.

The improved method is particularly adapted to be practiced in connection with the painting of automobiles, or the like. The lacquer, paint, or the equivalent, is usually sprayed upon the surface to be coated, the adjacent surfaces being covered or masked by sheets of paper, or the equivalent. The paper from old magazines or newspapers may be used for this purpose. The improved adhesive is applied either to the surface to be masked or to the paper. Thus, it may be applied along the edge of the paper which is then applied to the surface to be masked.

The improved adhesive will adhere to metal, lacquered or painted surfaces, wood, or substantially any other surface. As pointed out above, its use is not limited to masking operations as it has many other uses. Thus, for example, it may be applied to the bottom surfaces of rugs to prevent them from slipping on polished floors, or the equivalent.

One form of the invention is embodied in a non-drying adhesive which comprises the following ingredients, the proportions being approximately as stated:

| | Per cent |
|---|---|
| Solvent | 50 |
| Liquid rubber cement | 35 |
| Oil | 10 |
| Deodorant | 5 |

Any suitable solvents may be employed such as gasoline, naphtha or benzine, but benzine should not be employed when the adhesive is to be applied to lacquered surfaces, etc. When benzine is employed, a smaller proportion thereof may be employed than that given in the above formula.

Any suitable oil may be employed but a heavy mineral oil such as heavy lubricating oils is preferably utilized for this purpose.

Also, any suitable deodorant may be employed. Methyl salicylate has been employed for this purpose and gives satisfactory results.

A second form of the invention is combined in accordance with the following formula:

| | Per cent |
|---|---|
| Solvent | 50 |
| Liquid rubber cement | 28 |
| Rubber latex | 7 |
| Oil | 10 |
| Deodorant | 5 |

The solvents, oil and deodorant of the second formula are preferably identical with the solvents, oil and deodorant, respectively, utilized in connection with the first formula.

A third form of the invention is embodied in an adhesive which comprises the following ingredients:

| | Per cent |
|---|---|
| Solvent | 55 |
| Liquid rubber cement | 30 |
| Rubber latex | 5 |
| Oil | 5 |
| Deodorant | 5 |

The solvents, oil and deodorant discussed above are preferably utilized in compounding an adhesive which embodies the third form of the invention.

The oil specified in connection with each of the above formulæ serves as a retardant so that the adhesives are practically non-drying.

The preferred method of mixing the ingredients enumerated above is as follows: the rubber cement is first mixed thoroughly with the solvent after which the rubber latex (if used) and the oil and the deodorant are added in turn and thoroughly mixed.

It is apparent from the formulæ given above that one may deviate from the exact proportions stated. Therefore, it is to be understood that the invention is limited to these proportions only to the extent indicated in the appended claims.

When the improved adhesive is to be employed to secure the mask to a surface of an automobile, a sign or any other device which is being lacquered, painted, or the equivalent, the adhesive may be applied directly to the surface which is to be masked and the paper mask, or the equivalent, may be secured to the adhesive. However, the adhesive is preferably applied to the mask itself along the edges thereof, after which the mask is applied to the surface which is to be covered. An advantage of the improved adhesive is that when the mask is peeled from the covered surface after the painting operation, the adhesive adheres to the fibrous material or paper and peels off of the surface to which the mask was applied. Any adhesive remaining upon the surface which was masked may be removed quickly and easily with a damp cloth, or the equivalent.

The improved adhesive adheres with much tenacity to any surface to which it is applied. Therefore, masks secured in place by the adhesive will not be displaced when subjected to the pressure of paint spraying devices. As stated above, the mask should be peeled from the surface when the spraying operation is completed. This peeling is done by turning back one edge of the mask and pulling on said edge so as to strip the mask from the surface.

The improved adhesive is not limited to use in connection with masking devices, or the equivalent, as it has many other applications as an adhesive. Thus, as stated above, it may be applied to carpets, or the like, to hold them in place upon polished floors. The floors will not be injured and the carpets or rugs may be removed from the floor at any time by simply peeling them therefrom.

It will be readily understood that the deodorant may be omitted from any of the formulæ given above.

While I have shown and described certain embodiments of my invention, it is to be understood that it is capable of many modifications. Changes, therefore in the construction and arrangement may be made without departing from the spirit and scope of the invention as disclosed in the appended claims, in which it is my intention to claim all novelty inherent in my invention as broadly as possible, in view of the prior art.

I claim:

1. An adhesive comprising a volatile rubber solvent, rubber cement, and a heavy drying-retardant mineral oil.

2. An adhesive comprising approximately 50% volatile solvent, 35% rubber cement, and 10% heavy drying-retardant mineral oil.

3. An adhesive comprising approximately 55% volatile solvent, 30% rubber cement, 5% latex, and 5% of a heavy drying-retardant mineral oil.

4. An adhesive comprising a volatile solvent, liquid rubber cement, latex, and a heavy drying-retardant mineral oil.

RALPH A. WILSON.